United States Patent [19]

Strigle, Jr. et al.

[11] 3,937,769
[45] Feb. 10, 1976

[54] LIQUID DISTRIBUTOR

[75] Inventors: Ralph F. Strigle, Jr., Akron; Frank D. Moore, Tallmadge, both of Ohio

[73] Assignee: Norton Company, Worcester, Mass.

[22] Filed: Dec. 27, 1973

[21] Appl. No.: 428,886

[52] U.S. Cl............ 261/97; 261/114 R; 261/DIG. 44
[51] Int. Cl.$^2$ ............................................ B01F 3/04
[58] Field of Search..... 261/97, 98, DIG. 44, 114 R, 261/114 A, 114 TC; 239/533.3

[56] References Cited
UNITED STATES PATENTS

| | | | |
|---|---|---|---|
| 2,420,075 | 5/1947 | Glitsch | 261/114 TC |
| 2,582,657 | 1/1952 | Serner | 261/114 TC |
| 3,158,171 | 11/1964 | Eckert | 261/95 X |
| 3,273,872 | 9/1966 | Eckert | 261/97 X |
| 3,290,025 | 12/1966 | Engalitcheff, Jr. | 261/97 X |
| 3,360,246 | 12/1967 | Eckert | 261/98 |
| 3,392,966 | 7/1968 | Eckert | 261/97 |
| 3,392,967 | 7/1968 | Eckert | 261/98 |
| 3,410,540 | 11/1968 | Bruckert | 261/114 R X |
| 3,445,095 | 5/1969 | Braun et al. | 261/114 R |
| 3,570,825 | 3/1971 | Eckert | 261/98 X |

FOREIGN PATENTS OR APPLICATIONS 1,086,215  8/1960  Germany ................... 261/97

Primary Examiner—Tim R. Miles
Assistant Examiner—Richard L. Chiesa
Attorney, Agent, or Firm—Walter Fred

[57] ABSTRACT

A low flow liquid distributor for liquid/gas contact apparatus having a liquid feed splitter dividing the flow into a plurality of streams, an array of troughs extending across the cross sectional area of the contact apparatus, below the splitter, collects the plurality of streams and further divides the flow into a greater number of streams. A shallow pan situated under each of the troughs collects the streams and has upturned sides with drain openings extending upwardly from at least the junction with a downwardly sloping bottom of the pan of greater number than the streams deposited in the pan whereby low rates of liquid flow are obtainable and uniformly distributed onto a bed of tower packing for contact with a gas flowing therethrough.

2 Claims, 5 Drawing Figures

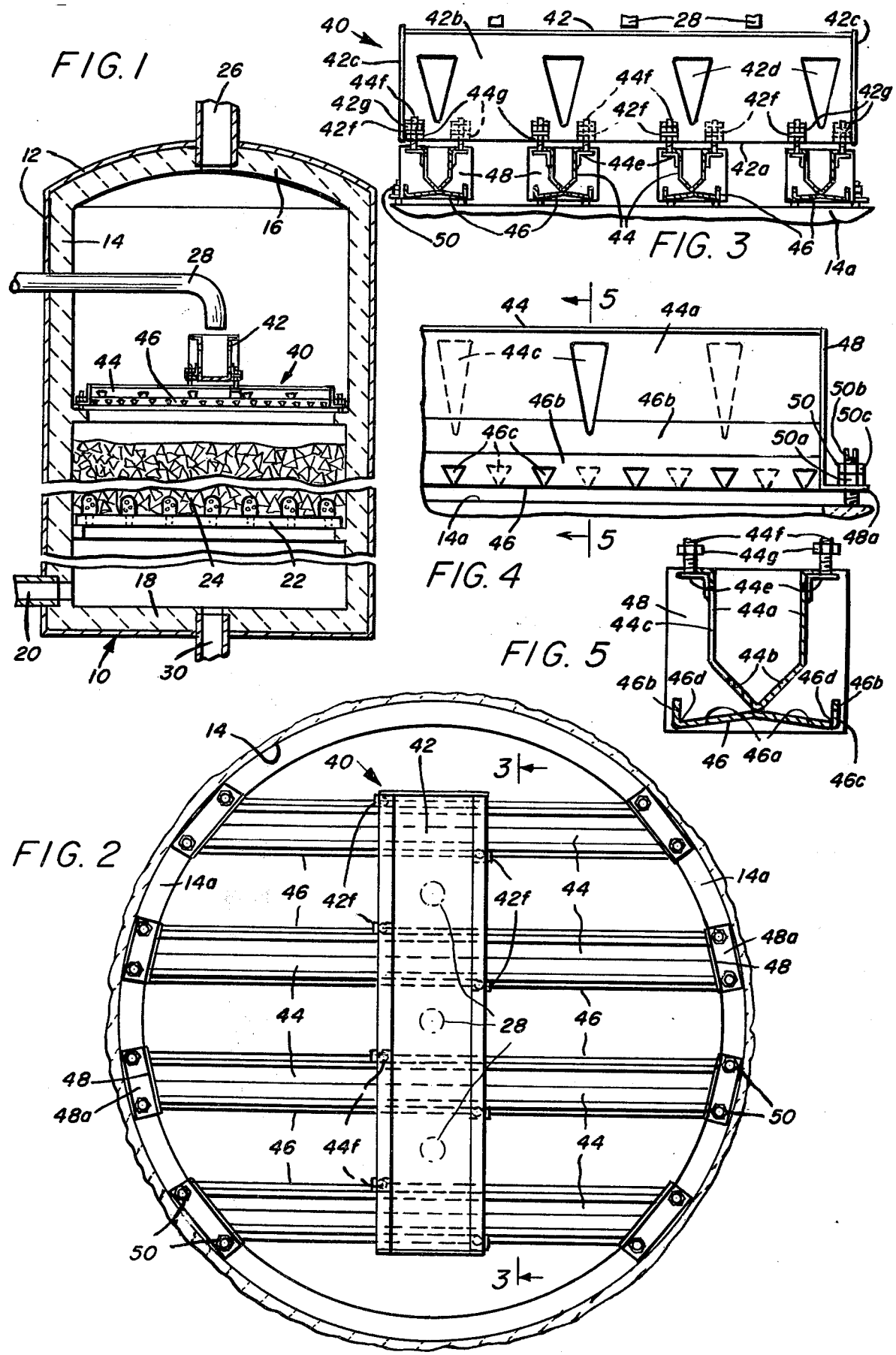

LIQUID DISTRIBUTOR

BACKGROUND OF THE INVENTION

1. Field of Invention

The invention relates to a trough-type distributor and particularly to a liquid flow distributor for use in a liquid/gas contact tower wherein uniform distribution of low rates of liquid flow are desired.

2. Description of the Prior Art

Heretofore, continuous uniform distribution of liquids in numerous small streams and at relatively low flow rates of less than 2 gallons per minute per square foot of the cross sectional area of the chamber in a liquid/gas contact tower, without causing unstable operation, entrainment of the gas and reducing the free gas space to much less than 50% of the cross sectional area of the tower was unobtainable with the use of any of the various trough type distributors known to the art.

Various prior art distributors similar in some respects to the applicants are shown in U.S. Pat. Nos. 3,360,246; 3,392,967 and 3,158,171.

However the prior art distributors shown in said patents either do not have or have an additional distributing bottom pan with openings and tubes through which both the liquid and gas virtually pass and thereby cause unstable operation and entrainment. The drain openings in the bottom pan extend vertically and are essentially orifices in that they flow full with a head of liquid on them. Applicant's distributor differs from the prior art in that there are no vertical tubes or holes through which both the gas and liquid can flow simultaneously and has drain openings situated in the sides of the bottom pan which act as weirs to provide a greater number of smaller streams of partial liquid flow with a slight head on them.

SUMMARY OF THE INVENTION

A low flow liquid distributor for liquid/gas contact apparatus wherein the distributor has a liquid feed splitter such as a parting box with spaced weirs in the sidewalls directing streams of liquid into a plurality of troughs and shallow pans closed at their ends and extending transversely under the splitter and above a bed of tower packing in a chamber to support means adjoining an inner wall of the apparatus. Each of the troughs have spaced openings or weirs in the sidewalls which further uniformly divide the liquid flow into a greater number of streams which are directed to flow into the shallow pan. The liquid flow collected by each of the pans flows along the downwardly sloping bottom of the pan and out through a relatively larger number of spaced drain openings or weirs extending through relatively short upturned sidewalls of the pans and upwardly from the junction of the bottom and sidewalls. Hence, liquid flowing at a relatively low rate into and out of the pans is further uniformly divided by the weirs into a still greater number of smaller continuous streams of uniform size which distribute the liquid uniformly over the tower packings for engagement with the gas passing therethrough.

Therefore it is the primary object of the invention to provide a liquid flow distributor which can uniformly divide and distribute a liquid flow at a relatively low rate of at least 0.3 of a gallon per minute for each square foot of cross sectional area of the treating chamber in a liquid/gas contact apparatus.

BRIEF DESCRIPTION OF THE DRAWING

FIG. 1 is a fragmentary vertical cross sectional view through a conventional liquid/gas contact tower with the distributor of the instant invention supported therein above the tower packing;

FIG. 2 is a plan view of the distributor of the invention;

FIG. 3 is a cross sectional view through the distributor taken on line 3—3 of FIG. 2;

FIG. 4 is a partial side view of one of the troughs and a bottom pan situated thereunder; and FIG. 5 is a cross sectional view through one of the troughs taken on line 5—5 of FIG. 4.

DESCRIPTION OF THE PREFERRED EMBODIMENT(S)

Referring to FIG. 1, there is shown a typical liquid/gas contact apparatus or chemical treatment tower 10 having an outer jacket 12 extending around an inner sidewall 14, a top wall 16 and a bottom wall 18 enclosing in this instance a circular inner chamber of predetermined cross sectional area. Gas to be treated by the liquid flow enters at the bottom of the chamber through a gas inlet pipe 20 in the sidewall 14 and passes upwardly through a perforated support plate 22 supported by the sidewall 14, a bed of tower packing 24, around the liquid distributor 40 of the invention supported by means such as an annular ledge 14a shown projecting inwardly from the inner sidewall 14 and out a gas outlet pipe 26 in the top wall 16.

Liquid is fed, at a predetermined number of gallons per minute, through one or more liquid inlet pipes 28 passing through the sidewall 14 into the distributor 40 from which it passes downwardly onto and through the bed of tower packing 24, the packing support plate and out a liquid outlet pipe 30 in the bottom wall 18.

In FIG. 2–5 there are shown various portions of the liquid distributor 40 of the invention. The distributor 40 comprises a liquid feed splitter means such as, a parting box or trough 42 which receives the initial liquid flow or feed from the pipe or pipes 28 and divides the liquid flow into a number of streams. The parting box or trough 42 which may be of any suitable conventional type and cross sectional shape has a bottom 42a and opposed sidewalls 42b extending upwardly from the bottom wall 42a and longitudinally to end plates 42c closing off the opposite ends of the box. In each of the opposite sidewalls 42b are a plurality of spaced openings or weirs 42d which divide the liquid flow into a plurality of streams of substantially uniform size and volume and directs the streams into an array of troughs 44 supported, beneath the splitter 42, by the ledge 14a. The openings or weirs 42d are preferably of triangular shape but may be of any other suitable geometric shape such as circular, square, elliptical, parabolic or of any other polygonal shape.

Likewise, the cross sectional configuration of the parting box 42 and the troughs 44 may be rectangular, square, triangular, V-shape, half round or a circular section and combinations thereof.

As shown there are preferably four pairs or sets of V-shape or triangular shape openings or weirs 42d of substantial identical size and shape spaced longitudinally in the sidewalls 42b of the splitter 42. There being four weirs in each sidewall aligned substantially with the four weirs in the opposite sidewall providing a total of eight liquid streams of substantially uniform size divided into pairs or sets of two streams flowing into each of the four troughs 44.

The troughs 44 are preferably equally spaced and extend longitudinally and transversely beneath the splitter 42 to opposite ends adjacent opposite portions of the inner wall 14. Preferably the cross sectional configuration and size of each of the troughs 44 is identical and comprises as shown in FIG. 5 upwardly extending spaced vertical opposite sides 44a and converging side or bottom walls 44b extending downwardly from the opposite sides 44a to a lower central or bottom portion at the center of the bottom of the trough. Each trough 44 has a large number of equally spaced apertures or weirs 44c of identical size and shape in each of the sidewalls 44a. Preferably the weirs or apertures 44c each have a configuration defined by and located within diverging sides extending upwardly through the sidewalls from a bottom or low point of convergence adjacent the lower central portion of the trough to either a top side extending between the diverging sides or the top edge of the sidewalls. All of the bottom points of the weirs being substantially on the same horizontal plane and at substantially the same height above the lower central portion of the trough so that the level of the liquid flow in the trough will be at or the same distance from each of the bottom points of the weirs 44c. Hence, a rise in the level of the liquid flow above the bottom points of the weirs will divide the liquid flow into a plurality of streams of uniform size and volume. Also, it can be seen in FIGS. 3 and 5 that the apertures 44c in one of the sidewalls 44a are staggered from, out of alignment with and located midway between those in the opposite wall of the troughs. Likewise, the apertures 44c in the facing or adjacent sidewall 44a of adjacent troughs are staggered relative to each other. The spacing and number of apertures or weirs 44c in each side of the trough depends on its length which is determined by its location in the cross sectional area of the chamber within the liquid/gas contact tower.

Referring to FIG. 2 and 3, adjustable support means are provided at the center of each trough 44 for leveling and supporting the parting box 42 above the troughs 44 and maintaining the desired spacing of the troughs 44 relative to the parting box. The support means comprises a pair of spaced angle brackets 44e fixed, to top flanges, and opposite sides 44a of the trough 44. A pair of threaded studs or bolts 44f are fixed at one of their ends to protruding legs on the angle brackets 44e, and extend upwardly through clearance holes in outwardly extending legs of a second pair of angle brackets 42f fixed to the opposite sides 42b of the splitter or parting box 42. There being a pair of an adjustable support nuts 44g threaded onto the studs 44f and which are in supporting engagement with the under side of the angle brackets 42f fixed to the splitter 42.

A second pair of lock nuts 42g are threaded onto the studs 44f and engage the opposite top sides of the brackets 42f. When it is desired to level and support the parting box 42 the nuts 42g are loosened, the support nut 44g adjusted up or down until the splitter box 42 is level and the lock nuts 42g tightened to fix the level position of the splitter 42.

An elongated shallow pan 46 is provided which extends substantially parallel to and longitudinally under each of the troughs 44 and collects the streams of liquid flowing through each of the apertures 44c. Each pan 46 has a bottom comprising a pair of inclined walls 46a which diverge and extend downwardly and outwardly substantially equal distances from a central ridge to opposite lower sides of the pan. The pan 46 is preferably positioned with the central ridge thereon located in the center and opposite the lower central portion of the trough 44. If desired the central ridge of the pan may be in contact with, spaced from or as shown fixed as by welding or riveting to the lower central portion of the trough 44. A pair of short sidewalls 46b extend upwardly from the lower sides and in each of which there are a plurality of drain openings or weirs 46c of relatively greater number than the apertures 44c in each wall of the trough 44 above. All of the drain openings or weirs 46c are preferably of identical size and shape, extending upwardly from their bottom or lowest points situated on a single level plane at least at the junction 46d of the bottom wall 46a with the short sidewall 46b. Thus, each of the drain openings 46c with bottom points situated at or below the junction 46d includes the junction 46d between the short sidewalls 46b and the inclined bottom walls 46a.

The openings or weirs 46c may be of rectangular, triangular, circular, parabolic, elliptical, V-shape or any of the polygonal shape and may extend to and be open at the top edge of the short sidewalls 46b. As shown each drain opening or weir 46c has preferably a triangular or V-shape with diverging sides extending upwardly from a converging point located at the junction 46d between the bottom and sides at the lower side of the pan to a top surface extending between the diverging sides of the drain openings adjacent the top edge. Referring to FIG. 4 it can be seen that the drain weirs 46c in each of the short side 46b are also staggered from, out of alignment with, and equally spaced from one another and from each of the apertures 44c in the adjacent wall 44a of the trough 44 above. Hence, each liquid stream flowing out an aperture 44c flows onto and down the inclined bottom wall 46 to an imperforate portion of the short sidewall between the weirs 46c whereupon the liquid stream is divided and flows in both directions along the junction 46d between the bottom and sides of the pan to the weirs 46c. Also, the troughs 44 and pans 46 are arranged so that the drain weirs 46c and streams flowing from adjacent pans are staggered relative to each other, whereby a plurality of uniformly spaced and staggered smaller streams of uniform size and volume distribute the liquid flow uniformly over the cross sectional area of the chamber and bed of tower packing therein. The distributor of the instant invention has preferably at least three or more drain openings or weirs 46c in the short sidewalls of the pans 46 for each square foot of cross sectional area of the chamber in the liquid contact apparatus.

Means are provided for closing off the ends of the troughs and pans to prevent liquid draining therefrom comprising an end plate 48 fixed, as by welding or any other suitable way, to opposite ends of the troughs 44 and pans 46. Each of the plates 48 extend at an angle across the short sides 46b of the pan and downwardly from the top of the troughs to the bottom of the pan 46 at which it is bent at substantially right angles to provide a support member or foot 48a. Each foot 48a extends outwardly, above the ledge 14a from the ends of troughs 44 and pans 46 which are cut off at an angle to suit the curvature of the inner wall 14 to an outer edge situated adjacent the inner wall 14 of the tower.

Leveling means are preferably provided for leveling and supporting each pair of troughs and attached pans comprising at least one adjustable leveling assembly 50 attached to the support member or foot 48a. Each leveling assembly 50 comprises a nut 50a fixed to the foot 48a, an adjustable threaded support screw or bolt 50b threaded through the nut 50a and extending through the foot into supporting engagement with the ledge 14a and a check or lock nut 50c for locking the screw 50b in an adjusted position. Obviously, each assembly comprising a trough and a pan beneath it, is leveled by loosening the check nuts 50c, adjusting the support screws 50b, and retightening the check nuts to maintain the level of the assembly.

Preferably, each trough 44 and pan 46 beneath it has a pair of the leveling and supporting assemblies 50 at each end which may be any other suitable type leveling mechanism. For example, the foot 48a on the end plate 48 at each end of the trough may be bent to level the trough and rest directly on the ledge 14a. Alternatively, the leveling assembly 50 could be attached to the ledge 14a and arranged to engage the foot 48a. Obviously, the troughs 44 and pans 46 in the distributor are leveled so that the level of the liquid flow in them will be of uniform depth to provide streams of uniform size and volume.

The distributor 40 of the instant invention is preferably fabricated from sheet metal having properties which resist attack by the elements in the environments to which it will be subjected. For example, the sheet metal may be carbon steel, stainless steel, monel, inconel, titanium, or a combination thereof. The various components are formed by bending to the desired configuration, punched to produce the apertures or weirs therein and by welding some of the portions together. The size of the various components of the distributor are predetermined, so that when assembled the distributor will occupy no more than 50% of the cross sectional area of the chamber and thereby allow a free gas space of at least 50% of the cross sectional area of the chamber around the distributor.

A distributor made according to the invention has been tested and found to be particularly useful for uniformly distributing a liquid flow at relatively low rates of from approximately 3 gallons per minute per square feet down to 0.3 of a gallon per minute for each square foot of cross sectional area of the chamber. The distributor tested had a maximum diameter of approximately 59⅝ inches and was supported in a chamber approximately 60 inches or 5 feet in diameter with a cross sectional area of approximately 20 square feet. The liquid flow was fed into the splitter means through three pipes situated between the pairs of weirs 42d. At flow rates of 6, 25 and 55 gallons per minute into the splitter 42, the distributor uniformly distributed 0.3, 1.27 and 2.80 gallons per minute respectively per square foot of the cross sectional area of the chamber, over the bed of tower packing.

The gas to be treated flows up through the bed of tower packing wherein the distributed liquid is contacted by the gas, around the pans 46, troughs 44 and parting box 42 without being entrained by or disrupting the plurality of streams of liquid flowing from the distributor at relatively low rates.

Although the distributor is primarily for low flow rates it is obvious that it can if desired distribute the liquid at greater flow rates. Liquid introduced at increased rates of flow cause the level of the liquid to rise in the splitter 42, troughs 44 and pans 46. As the level of the liquid flow rises the size and volume of the streams increase in proportion to the increase in the size and area of the openings or weirs. When a larger amount is to be distributed the level of the liquid rises above and flows over the short sidewalls of the pan which also gives a fairly uniform distribution of the liquid flow.

Hence, the applicant's invention provides a liquid distributor useful for uniformly distributing large as well as relatively small amounts of liquid flow over a wide cross sectional area of a liquid gas contact tower or the like.

As many possible embodiments and modifications may be made without departing from the intended scope and spirit of the invention, it is to be understood that the invention includes all embodiments, modifications and equivalents thereof falling within the scope of the appended claims.

What is claimed is:

1. A liquid distributor for use in a liquid/gas contact tower having liquid feed splitter means for receiving a source of liquid feed and dividing the liquid feed into a plurality of liquid streams and a plurality of troughs including apertures in opposite sidewalls thereof disposed beneath and extending transversely outward from the splitter means, across a chamber of predetermined cross sectional area to support means adjoining an inner wall of the contact tower, for receiving the liquid streams and further dividing the liquid feed into a greater number of streams, wherein the improvement comprises:

a pan disposed beneath each of the troughs for collecting, the liquid streams flowing from the trough and further dividing the liquid flowing into the pan and each pan having a central ridge, a pair of inclined bottom walls diverging outwardly and downwardly from the central ridge to opposite lower sides, a pair of short sidewalls extending upwardly from a junction with the inclined bottom walls at the opposite lower sides, and a plurality of drain openings located solely in each of the short sidewalls of the pan of greater number than the apertures in each sidewall of the trough and each of the drain openings having a configuration defined by and situated within diverging sides extending upwardly from a bottom point of convergence located at least at the junction of the short sidewall with the inclined bottom wall and out of alignment with the apertures in an adjacent sidewall of the trough and there being at least three drain openings in the short sidewalls of the pans for each square foot of cross sectional area of the chamber;

converging walls, on each of the troughs, extending downwardly from the opposite sides to and converging at a lower central portion situated above and substantially opposite the central ridge of the pan beneath the trough, and wherein each of the apertures in the opposite sidewalls of the trough have a configuration defined by and located within diverging sides extending upwardly from a bottom point adjacent the lower central portion to a top side extending between the diverging sides; and means at opposite ends of the troughs and the pans for closing off and preventing the liquid from draining therefrom;

whereby a relatively low rate of liquid feed supplied to the distributor is divided by the apertures in the troughs, and thereafter further divided and uniformly distributed over the cross sectional area of the chamber by flowing down the inclined bottom wall and out of the bottoms of the drain openings at the junction without substantially increasing the level of the liquid in the pan.

2. A liquid distributor according to claim 1 further comprising:

adjustable means, attached to the troughs for leveling and supporting the troughs, pans and the splitter means within the chamber and providing a substantially uniform depth of the liquid in the troughs, pans and the splitter means.

* * * * *